United States Patent
Jiang et al.

(10) Patent No.: US 12,423,757 B2
(45) Date of Patent: Sep. 23, 2025

(54) SPATIAL SIMULATION METHOD FOR ASSESSMENT OF DIRECT ECONOMIC LOSSES OF TYPHOON FLOOD BASED ON REMOTE SENSING

(71) Applicant: China Institute of Water Resources and Hydropower Research, Beijing (CN)

(72) Inventors: Wei Jiang, Beijing (CN); Juan Lv, Beijing (CN); Shiai Cui, Beijing (CN); Zhiguo Pang, Beijing (CN); Xiaotao Li, Beijing (CN); Xiaohui Ding, Jiangxi (CN); Gan Luo, Beijing (CN); Tengfei Long, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 36 days.

(21) Appl. No.: 18/509,656

(22) Filed: Nov. 15, 2023

(65) Prior Publication Data
US 2024/0242289 A1 Jul. 18, 2024

(30) Foreign Application Priority Data
Jan. 10, 2023 (CN) .................. 202310033916.6

(51) Int. Cl.
*G06F 30/27* (2020.01)
*G06Q 40/08* (2012.01)

(52) U.S. Cl.
CPC ............ *G06Q 40/08* (2013.01); *G06F 30/27* (2020.01)

(58) Field of Classification Search
CPC ..................................................... G06Q 40/08
USPC ........................................................... 705/4
See application file for complete search history.

(56) References Cited

U.S. PATENT DOCUMENTS

| 11,521,379 B1 | 12/2022 | Wang et al. |
| 2008/0021659 A1* | 1/2008 | Bertogg .................. G01V 1/01 702/14 |

(Continued)

FOREIGN PATENT DOCUMENTS

| CN | 203593996 U | 5/2014 |
| CN | 112819340 A | 5/2021 |

(Continued)

OTHER PUBLICATIONS

First Office Action for China Application No. 202310033916.6, mailed Jul. 7, 2023.

(Continued)

*Primary Examiner* — Robert R Niquette
(74) *Attorney, Agent, or Firm* — Piloff Passino & Cosenza LLP; Rachel K. Piloff; Sean A. Passino

(57) ABSTRACT

Disclosed is a spatial simulation method for assessment of direct economic losses of a typhoon flood based on a remote sensing, and the method includes following steps: S1, collecting a multi-source data before and after a typhoon flood disaster in an affected area and preprocessing the said data to obtain a preprocessed data; S2, extracting reset parameters of a hazard-bearing body according to the preprocessed data and constructing a feature set of the reset parameters of the hazard-bearing body; S3, collecting insurance disaster assessment data and historical investigation data in the typhoon flood-affected area, and constructing a sample set of direct economic losses of the hazard-bearing body; and S4, carrying out a spatial simulation of the direct economic losses of the hazard-bearing body by adopting a deep learning of a neural network model according to the feature set of the reset parameters and the sample set of direct economic losses.

5 Claims, 10 Drawing Sheets

(56) References Cited

U.S. PATENT DOCUMENTS

| | | | |
|---|---|---|---|
| 2008/0208721 A1* | 8/2008 | Bertogg | G06Q 40/08 |
| | | | 705/35 |
| 2015/0073834 A1* | 3/2015 | Gurenko | G06Q 40/08 |
| | | | 705/4 |
| 2021/0279852 A1* | 9/2021 | Jakka | G06T 7/0002 |
| 2022/0155485 A1* | 5/2022 | Glassman | G06Q 40/08 |
| 2023/0152487 A1* | 5/2023 | Erinjippurath | G06N 20/00 |
| | | | 702/3 |

FOREIGN PATENT DOCUMENTS

| | | |
|---|---|---|
| CN | 112862922 A | 5/2021 |
| CN | 113723849 A | 11/2021 |
| CN | 114266502 A | 4/2022 |
| CN | 114676551 A | 6/2022 |
| CN | 115311557 A | 11/2022 |
| KR | 20210085592 A | 7/2021 |
| KR | 102399089 B1 | 5/2022 |

OTHER PUBLICATIONS

Song Yinghua et al., "Analysis on exposure of disaster-bearing bodies and pedestrians' instability risk under urban waterlogging," China Safety Science Journal, Oct. 2020, vol. 30, No. 10.

Zhang Jie, "Rainstorm and Flood Risk Regionalization in Southern Anhui Province Basedon GIS," Chinese Journal of Agricultural esources and egional Planning, Jun. 2017, pp. 121-129, vol. 38, No. 6.

\* cited by examiner

| Selecting a precipitation product of GPM (Global Precipitation Mission) IMERG (Integrated Multi-satellitE Retrievals for GPM), downloading product data sets of time periods before and after the disaster, reading and generating tiff files through ArcGIS (Geographic Information System), and resampling to 30-meter spatial resolution through a bilinear interpolation method | Step B1 |
|---|---|
| Selecting a near real-time product data set of Meteorological Office using python to batch process original files of the near real-time product data set and converting the original files of the near real-time product data set into a raster data set, and resampling images in the raster data set to 30-meter spatial resolution by the bilinear interpolation method, and completing a preprocessing of the typhoon meteorological index data | Step B2 |

FIG. 4

SPATIAL SIMULATION METHOD FOR ASSESSMENT OF DIRECT ECONOMIC LOSSES OF TYPHOON FLOOD BASED ON REMOTE SENSING

CROSS-REFERENCE TO RELATED APPLICATIONS

This application claims priority to Chinese Patent Application No. 202310033916.6, filed on Jan. 10, 2023, the contents of which are hereby incorporated by reference.

TECHNICAL FIELD

The disclosure relates to a technical field of remote sensing analysis of typhoon flood disasters, and in particular to a spatial simulation method for the assessment of direct economic losses of typhoon flood based on a remote sensing.

BACKGROUND

Assessing direct economic losses is an important aspect of disaster emergency management. Scientifically, accurately, and objectively understanding the spatial distribution of economic losses related to hazard-bearing bodies provides vital guidance for disaster response decision-making and post-disaster reconstruction. Typhoon flood has the characteristics of wide influence range, strong destruction intensity and long duration, and primarily affect mostly economically developed areas, and resulting in substantial property losses annually.

The direct economic losses of typhoon flood hazard-bearing bodies encompasses the expenses associated with restoring or repairing various types of hazard-bearing bodies to their pre-disaster functionality and condition after being damaged by a typhoon flood. At present, the direct economic losses of typhoon flood hazard-bearing bodies is mostly reported at the administrative boundary level providing valuable insights into the extent of disaster-related losses for countries and regions. However, this reporting method is susceptible to significant errors due to differences in statistical criteria and human subjectivity. It also fails to account for the variations in the distribution of disaster losses intensity within administrative boundaries. Therefore, the statistical method restricts the scientific accuracy of assessing typhoon flood losses to some degree and falls short of meeting the precision requirements of flood catastrophe insurance assessment and claims settlement. At present, there are two main types of models used for simulating the direct economic losses of typhoon flood hazard-bearing bodies: statistical models and multi-index evaluation methods. The simulation of direct economic losses in typhoon flood hazard-bearing bodies involves numerous indicators that exhibit strong spatial correlations. Additionally, the determination of weights for these multiple indicators is often influenced by human subjectivity. The intelligent machine learning method represented by deep network may explore a complex nonlinear correlation mechanism between multi-feature indicators and the direct economic losses of typhoon flood hazard-bearing bodies by learning through training samples. In view of the above drawbacks, there is a need for improved systems and methods for spatial simulation of direct economic losses in typhoon flood hazards.

To address the significant estimation errors associated with existing methods for simulating the direct economic losses of typhoon flood hazard-bearing bodies, this invention presents a spatial simulation method reliant on remote sensing for assessing direct economic losses resulting from typhoon floods.

RELEVANT PRIOR ART

The field of disaster assessment and forecasting has seen various methods and technologies aimed at enhancing our understanding of catastrophic events and their economic impact. Notably, these methods have different focuses and applications compared to the spatial simulation of direct economic losses due to typhoon floods based on remote sensing, which is the core aim of the present invention.

The relevant prior art references collectively demonstrate the diversity of methods and technologies employed in the field of disaster assessment and forecasting with each reference offering distinct approaches, focuses, and applications.

Among these references, CN112819340A delves into urban flood assessments using multi-source data, focusing on dynamic assessment in urban areas. Building upon this, KR20210085592A addresses the complexities of mega flood and dam breach simulations caused by continuous rainfall, primarily emphasizing precise rainfall-runoff analysis and efficient flood preparation. In a related vein, CN113723849A introduces a method for flood event and risk identification based on spatial-temporal characteristics, focusing on assessing flood disaster situations and identifying risks. CN114266502A takes an innovative approach by concentrating on flood disaster losses assessment and simulation deduction using satellite remote sensing and sensor data, enhancing losses evaluation accuracy. Meanwhile, U.S. Ser. No. 11/521,379B1 leverages vision transformer technology for flood disaster monitoring and analysis, emphasizing deep learning and radar data. Further, US20070168155A1 pioneers a statistical-deterministic approach to predict natural disasters, providing valuable insights into disaster prediction. Lastly, US20220268963A1 contributes a system and method for environment-dependent probabilistic tropical cyclone modeling, offering a distinct perspective by focusing on modeling tropical cyclones and assessing cyclone risk.

None of the cited prior art references disclose the present invention's method for spatially simulating method for the assessment of direct economic losses resulting from typhoon floods based on remote sensing. The present invention uniquely addresses the shortcomings of existing methods and presents an innovative approach to assessing economic losses in the context of typhoon floods utilizing remote sensing and deep learning techniques for more accurate and objective results.

SUMMARY

The present invention provides a spatial simulation method for the assessment of direct economic losses of typhoon flood based on a remote sensing implemented in a computer system using a set of computer-executable instructions includes following steps:

S1, collecting a multi-source data before and after a typhoon flood disaster in an affected area and preprocessing the said data to obtain a preprocessed data;

S2, extracting reset parameters of a hazard-bearing body according to the preprocessed data, and constructing a feature set of the reset parameters of the hazard-bearing body;

S3, collecting insurance disaster assessment data and historical investigation data in the typhoon flood affected area, and constructing a sample set of direct economic losses of the hazard-bearing body; and S4, carrying out a spatial simulation on the direct economic losses of the typhoon flood hazard-bearing body by adopting a deep learning neural network model according to the feature set of the reset parameters of the typhoon flood hazard-bearing body and the sample set of the direct economic losses of the hazard-bearing body.

Further, the multi-source data in the S1 includes time series remote sensing data, typhoon meteorological index data, underlying surface risk exposure data and typhoon flood disaster losses data.

Further, a method for collecting and preprocessing the time series remote sensing data includes following steps:

Step A1, obtaining radar remote sensing data of Gaofen-3 and Sentinel-1 and optical remote sensing data of Gaofen-1, Gaofen-6 and Sentinel-2 before and after disaster in the typhoon flood affected area, where the optical remote sensing data selects cloud-free and snow-free data;

Step A2, performing an orbit correction, an image clipping, a filtering processing, a radiometric calibration, a terrain correction, a geocoding and an image mosaic on the radar remote sensing data to obtain preprocessed radar remote sensing data;

Step A3, performing a radiation calibration, an atmospheric correction, a geometric correction, a band registration, a multi-band image synthesis and an image fusion on the optical remote sensing data to obtain preprocessed optical remote sensing data; and Step A4, unifying the preprocessed radar remote sensing data and the preprocessed optical remote sensing data to 30-meter resolution through an image registration and a resampling, and completing a preprocessing on the time series remote sensing data.

Further, a method for collecting and preprocessing the typhoon meteorological index data includes following steps:

Step B1, selecting a precipitation product of GPM (Global Precipitation Mission) IMERG (Integrated Multi-satellitE Retrievals for GPM), downloading product data sets of time periods before and after the disaster, reading and generating tiff files through ArcGIS, and resampling to 30-meter spatial resolution through a bilinear interpolation method; and Step B2, selecting a near real-time product data set of Meteorological Administration Office, using python to batch process original files of the near real-time product data set and converting the original files of the near real-time product data set into a raster data set, and resampling images in the raster data set to 30-meter spatial resolution by the bilinear interpolation method, and completing a preprocessing on the typhoon meteorological index data.

Further, a method for collecting and preprocessing the underlying surface risk exposure data includes following steps:

Step C1, obtaining latest fine land use data at 10 m global spatial resolution with secondary classification;

Step C2, obtaining hazard-bearing body cost data from the relevant Economic and Social Development Statistical Database;

Step C3, selecting cloud-free, geometrically and radiatively corrected NPP-VIIRS or sustainable development satellite night light remote sensing data;

Step C4, filtering the night light remote sensing data, eliminating noise and interfering light sources in original night light remote sensing data, and performing a median synthesis on filtered night light remote sensing data set to obtain stable night light remote sensing data; and Step C5, resampling the stable night lighting remote sensing data to 30-meter resolution, and completing a preprocessing on the underlying surface risk exposure data.

Further, the reset parameters of the typhoon flood hazard-bearing body in the S2 include a flood inundation maximum range feature V1, a flood inundation depth feature V2, a flood inundation duration feature V3, hourly maximum rainfall V4, daily maximum rainfall V5, a maximum wind speed V6, a maximum atmospheric pressure V7 and risk exposure feature V8;

a formula for calculating the flood inundation maximum range feature V1 is:

$$V1 = \begin{cases} 1 & \sum T_{i,j} > 0 \\ 0 & \sum T_{i,j} < 0 \end{cases},$$

where $T_{i,j}$ represents a flood inundation classified image with a pixel row number of i, j;

a formula for calculating the flood inundation depth feature V2 is:

$$V2 = H_{max} - H_{i,j},$$

where $H_{max}$ represents a maximum elevation in a closed water area, and $H_{i,j}$ represents a digital elevation value with the pixel row number of i, j;

a formula for calculating the flood inundation duration feature V3 is:

$$V3 = \sum \Delta t_{i,j},$$

where $\Delta t_{i,j}$ represents an image imaging time difference between flood inundation pixels in adjacent images with the pixel row number of i, j;

formulas for calculating the hourly maximum rainfall V4 are:

$$V4_{i,j} = \max\{RH_d\}_{i,j}$$
$$RH_d = N_m + N_{m+1},$$

where $RH_d$ represents a rainfall product of a d-th hour, $N_m$ represents an m-th rainfall product, and subscripted i, j represents the pixel row number;

formulas for calculating the daily maximum rainfall V5 are:

$$V5_{i,j} = \max\{RD_r\}_{i,j}$$
$$RD_r = N_l + N_{l+1} + \ldots + N_{l+23},$$

where $RD_r$ represents a rainfall product on an r-th day, and $N_l$ represents an l-th precipitation product;

a formula for calculating the maximum wind speed V6 is:

$$V6_{i,j} = \max\{W_n\}_{i,j},$$

where $W_n$ represents a data set of time series wind speeds, and subscripted n represents a serial number in the data set;

a formula for calculating the maximum atmospheric pressure V7 is:

$$V7_{i,j} = \max\{P_n\}_{i,j},$$

where $P_n$ represents a data set of time series air pressures;

a formula for calculating the risk exposure feature V8 is:

$$V8 = aZ + b,$$

where Z represents the night light remote sensing radiation intensity, and a and b are a coefficient and an intercept obtained by training respectively.

Further, the feature set of the reset parameters of the typhoon flood hazard-bearing body constructed in the S2 is:

$$H = S(V1, V2, V3, V4, V5, V6, V7, V8),$$

where H represents the feature set of the reset parameters of the typhoon flood hazard-bearing body, and S represents a set feature.

Further, the S3 includes following sub-steps:

S31, collecting the insurance disaster assessment data and the historical investigation data in the typhoon flood affected area, dividing according to a 30 m×30 m grid, and selecting grids with more than five historical investigation data items as sample grids to form samples of the direct economic losses of the typhoon flood;

S32, determining direct economic losses P with different property types per unit area or quantity by a statistical average method according to the historical investigation data in the typhoon flood affected area;

S33, obtaining an affected area or quantity Q of each property type according to a comparison of high-resolution satellite remote sensing data before and after the disaster; and S34, constructing the sample set Y of the direct economic losses of the hazard-bearing body according to the direct economic losses P and the affected area or quantity Q:

$$Y = \{y_i, i = 1, 2, \ldots, n\}$$

$$y_i = Q_i \times P_i,$$

where $y_i$ represents a total direct economic losses of an i-th sample, $Q_i$ represents an affected area or quantity of the i-th sample, $P_i$ represents a direct economic losses of the i-th sample, and n represents a total number of samples.

Further, the S4 includes following sub-steps:

S41, correspondingly extracting the reset parameters of the typhoon flood hazard-bearing body of 30 m×30 m grids from the feature set of the reset parameters of the typhoon flood hazard-bearing body according to spatial grid positions of the samples of the direct economic losses of the typhoon flood;

S42, normalizing all reset parameters of the typhoon flood hazard-bearing body:

$$x_{ij} = \frac{\overline{x}_{ij} - x_i^{min}}{x_i^{max} - x_i^{min}},$$

where $\overline{x}_{ij}$ represents a j-th sample of an i-th feature before a normalization, $x_{ij}$ represents a j-th sample of an i-th feature after the normalization, $x_i^{min}, x_i^{max}$ respectively represent a minimum value and a maximum value of the i-th feature;

S43, constructing an input training sample $X=\{x_{ij}\}$ of a deep learning neural network model according to a normalized typhoon flood disaster-bearing weight parameter $x_{ij}$;

S44, setting an input layer of the deep learning neural network model to include 8 neurons, and setting several hidden layers in a middle, and obtaining a predicted value f(x,w) at an output layer:

$$f(x, w) = \sum_{i=1}^{k} x_{ij} \times w_{ij} + b_j,$$

where x represents an input of a neural network, w represents a weight, $w_{ij}$ represents a weight parameter corresponding to $x_{ij}$, and $b_j$ represents an offset corresponding to $x_{ij}$;

S45, setting a losses function φ(x) of the deep learning neural network model:

$$\varphi(x) = \frac{1}{n}\sum_{j=1}^{n}\left(f(x^j, w) - y^j\right)^2,$$

where n represents a number of samples, $f(x^j,w)$ represents a predicted value of the j-th sample and $y^j$ represents a true value of the j-th sample;

S46, optimizing the losses function by using Stochastic Gradient Descent (SGD), updating the weight parameter and the offset of the feature after each iteration, and keeping training iterations until a value of the losses function is minimized, expressing the updated weight parameter $W_{new}$ and the updated offset $B_{new}$ as:

$$W_{new} = W - \eta \nabla_W \varphi(W, B, X, Y)$$

$$B_{new} = B - \eta \nabla_B \varphi(W, B, X, Y),$$

where η represents a learning rate, $\nabla_W \varphi(W,B,X,Y)$ represents a gradient of the losses function in a direction of the weight W, and $\nabla_B \varphi(W,B,X,Y)$ represents a gradient of the losses function in a direction of the offset B;

S47, evaluating the trained deep learning neural network model by verifying the samples, and verifying the accuracy of the model; where evaluation indexes are an average absolute error MAE and an accuracy ACC:

$$MAE = \frac{1}{n}\sum_{i=1}^{n}|Y' - Y|$$

$$ACC = \left[1 - \frac{|Y' - Y|}{Y}\right] \times 100,$$

where Y' represents a direct economic losses of the hazard-bearing body predicted by the model, and Y represents a real direct economic losses of the hazard-bearing body; and S48, using the verified deep learning neural network model for a spatial grid simulation calculation, and obtaining a spatial simulation result of the direct economic losses of the typhoon flood hazard-bearing body.

The disclosure has following beneficial effects:

(1) The disclosure integrates various reset parameters of typhoon flood, and by constructing an intelligent simulation model, the simulation results may spread spatial differences of direct economic losses on the grid scale, thus breaking through the bottleneck problem that the original investigation error of typhoon flood losses based on administrative boundaries is large.

(2) The disclosure adopts multi-source remote sensing and meteorological data to extract the reset parameters of the typhoon flood hazard-bearing body, and constructs the feature set of the reset parameters of the typhoon flood hazard-bearing body, the parameter types are various and the extraction accuracy is high.

(3) The intelligent simulation model of the typhoon flood hazard-bearing body is constructed by the deep learning neural network algorithm, has high spatial applicability and may deeply explore the complex correlation mechanism between multiple reset parameters and the direct economic losses of the typhoon flood hazard-bearing body.

BRIEF DESCRIPTION OF THE DRAWINGS

FIG. 4 illustrates steps involved in collecting and preprocessing typhoon meteorological index data, including GPM IMERG precipitation data and near real-time product data.

DETAILED DESCRIPTION OF THE EMBODIMENTS

Figure 1:
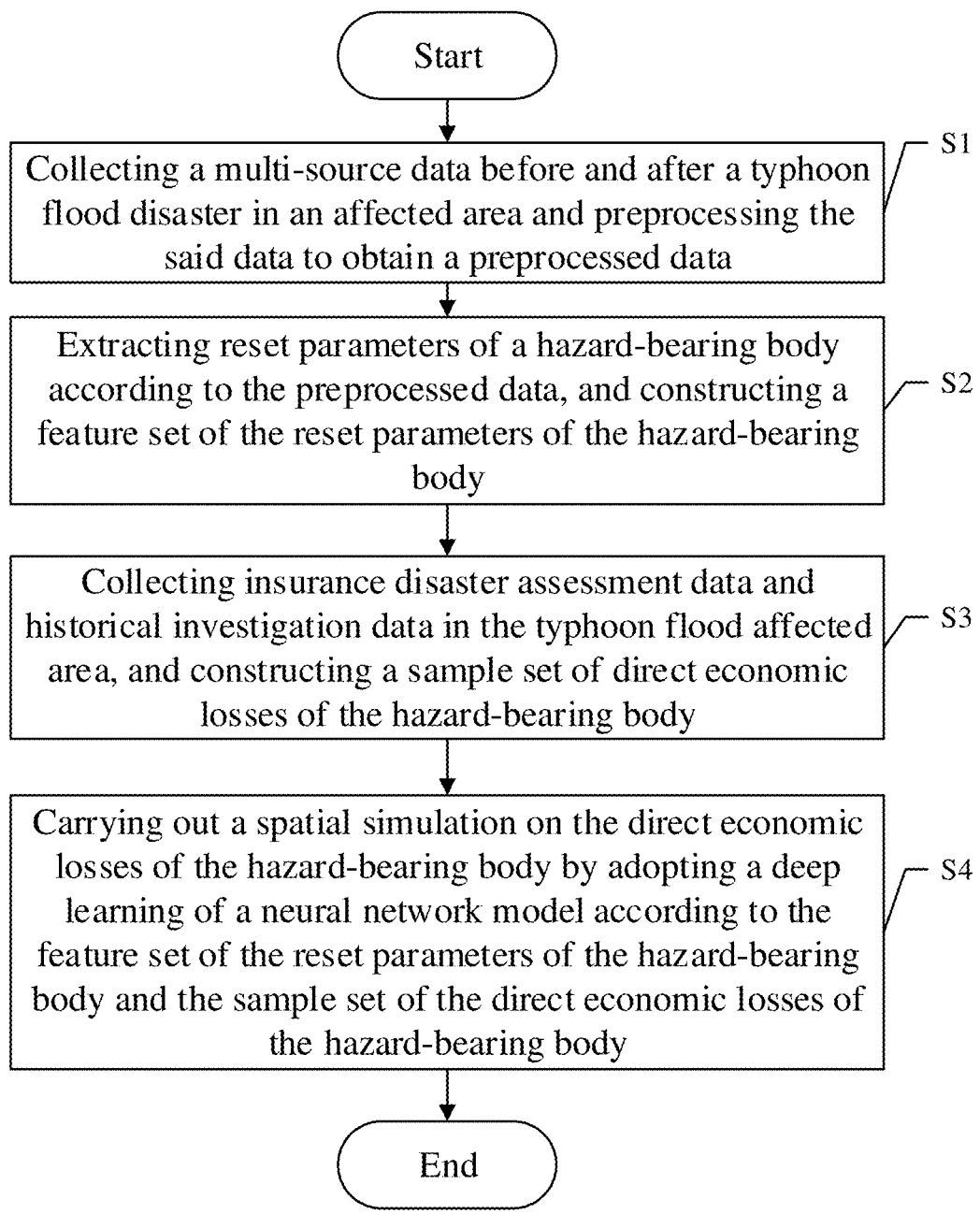
FIG. 1 is a flowchart of a spatial simulation method for a direct economic loss of a typhoon flood based on a remote sensing provided by an embodiment of the present disclosure.

The detailed description of the embodiments provides an in-depth exploration of the spatial simulation method for assessing direct economic losses resulting from typhoon floods based on remote sensing technology implemented in a computer system using a set of computer-executable instructions. It outlines the steps, procedures, and key features of the disclosure, including the collection and preprocessing of various data sources, the construction of feature sets, and the implementation of deep learning neural network models.

Throughout the specification, the word "comprise" or variations such as "comprises" or "comprising" will be understood to imply the inclusion of a stated integer or groups of integers but not the exclusion of any other integer or groups of integers.

As used herein, the following definitions shall apply unless otherwise indicated.

A "spatial simulation method" refers to a technique or process for creating a computer-based model or simulation that replicates and analyzes the behavior, interactions, or changes of objects, phenomena, or events within a defined physical or geographical space.

A "hazard-bearing body" refers to an entity, or organization that carries or is associated with a hazard, which is something that poses the potential for harm, damage, or danger to individuals, assets, or the environment.

The terms "Gaofen-1", "Gaofen-6", and "Sentinel-2" are Earth observation satellites used for remote sensing and data collection.

The "Global Precipitation Mission (GPM)" is a joint mission between NASA (the National Aeronautics and Space Administration) and the Japan Aerospace Exploration Agency (JAXA) that aims to provide global observations of precipitation, including rain and snow. GPM uses a constellation of satellites to collect data on precipitation from around the world, allowing for the monitoring of rainfall and snowfall patterns on a global scale.

The "Integrated Multi-satellite Retrievals for GPM (IMERG)" refers to a product developed as part of the Global Precipitation Measurement (GPM) mission. IMERG is a dataset that combines precipitation data from multiple satellites to create a global and near-real-time estimate of rainfall. It provides information about precipitation rates and accumulations on a global scale.

The term "Meteorological Office" typically refers to a government agency or organization responsible for monitoring and providing weather forecasts and other meteorological information for a specific region or country.

The term "ArcGIS" is derived from the term "geographic information system," emphasizing its focus on the creation, analysis, and management of geographic or spatial information. The "Arc" in ArcGIS originally referred to the software's use of vector-based graphics and the use of arcs to represent geographic features in early versions.

The "Economic and Social Development Statistical Database" typically refers to a collection of data and statistics related to various aspects of a country's or region's economic and social development. These databases are often maintained by government agencies, international organizations, or research institutions and contain a wide range of information on economic indicators, social demographics, and other relevant data.

Exemplary embodiments of the present disclosure now are described in detail with reference to the accompanying drawings. It should be understood that the embodiments shown and described in the drawings are merely exemplary, are intended to illustrate the principles and spirit of the disclosure, and not to limit the scope of the disclosure.

The embodiment of the disclosure provides a spatial simulation method for a direct economic loss of a typhoon flood based on a remote sensing, as shown in FIG. 1, including following steps of S1 to S4:

S1, collecting multi-source data before and after a disaster in a typhoon flood affected area and preprocessing to obtain preprocessed data.

In the embodiment of the disclosure, the multi-source data are mainly used for extracting flood inundation features and meteorological disaster indexes, performing a heterogeneous spatial distribution of property direct economic losses information and sorting out direct economic losses investigation data, and includes time series remote sensing data, typhoon meteorological index data, underlying surface risk exposure data and typhoon flood disaster losses data.

Figure 3:
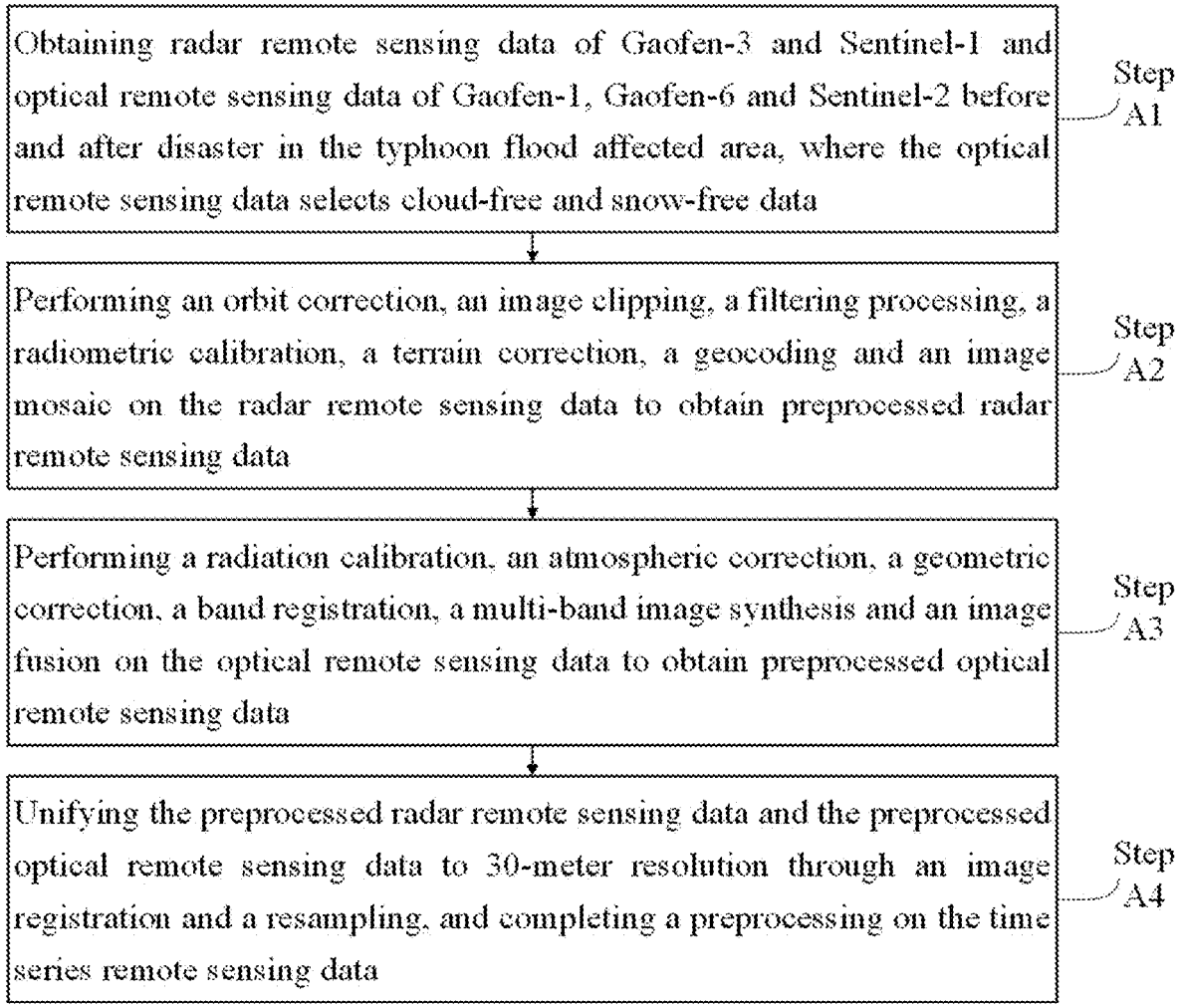
FIG. 3 illustrates a preprocessing of time series remote sensing data, encompassing radar and optical data integration and correction processes.

As shown in FIG. 3, a method for collecting and preprocessing the time series remote sensing data is as follows:

Step A1, obtaining radar remote sensing data of Gaofen-3 and Sentinel-1 and optical remote sensing data of Gaofen-1, Gaofen-6 and Sentinel-2 before and after disaster in the typhoon flood affected area, where the optical remote sensing data selects cloud-free and snow-free data;

Gaofen-3 and Sentinel-1 satellites are equipped with a C-band synthetic aperture radar, have multiple imaging modes and a resolution of up to 1 m. The optical remote sensing data of Gaofen-1, Gaofen-6 and Sentinel-2 include 2 m panchromatic/8 m multispectral, 10 m, 20 m and 60 m multispectral images.

Step A2, performing an orbit correction, an image clipping, a filtering processing, a radiometric calibration, a terrain correction, a geocoding and an image mosaic on the radar remote sensing data to obtain preprocessed radar remote sensing data.

Step A3, performing a radiation calibration, an atmospheric correction, a geometric correction, a band registration, a multi-band image synthesis and an image fusion on the optical remote sensing data to obtain preprocessed optical remote sensing data.

Step A4, unifying the preprocessed radar remote sensing data and the preprocessed optical remote sensing data to 30-meter resolution through an image registration and a resampling, and completing a preprocessing on the time series remote sensing data.

As shown in FIG. 4, a method for collecting and preprocessing the typhoon meteorological index data is as follows:

Step B1, selecting a precipitation product of GPM (Global Precipitation Mission) IMERG (Integrated Multi-satellitE Retrievals for GPM), downloading product data sets of time periods before and after the disaster, reading and generating tiff files through ArcGIS, and resampling to 30-meter spatial resolution through a bilinear interpolation method.

The precipitation product of IMERG has high precision, the highest time resolution is once every half hour, and the spatial resolution is 0.1°×0.1° (10 km).

Step B2, selecting a near real-time product data set of Meteorological Administration Office, using python to batch process original files of the near real-time product data set and converting the original files of the near real-time product data set into a raster data set, and resampling images in the raster data set to 30-meter spatial resolution by the bilinear interpolation method, and completing a preprocessing on the typhoon meteorological index data.

The near real-time products of CLDAS-V2.0 include wind speed, ground pressure, temperature and other products, and the spatial resolution is 0.0625°×0.0625° (6750 m), and is updated every 3 hours.

Figure 5:
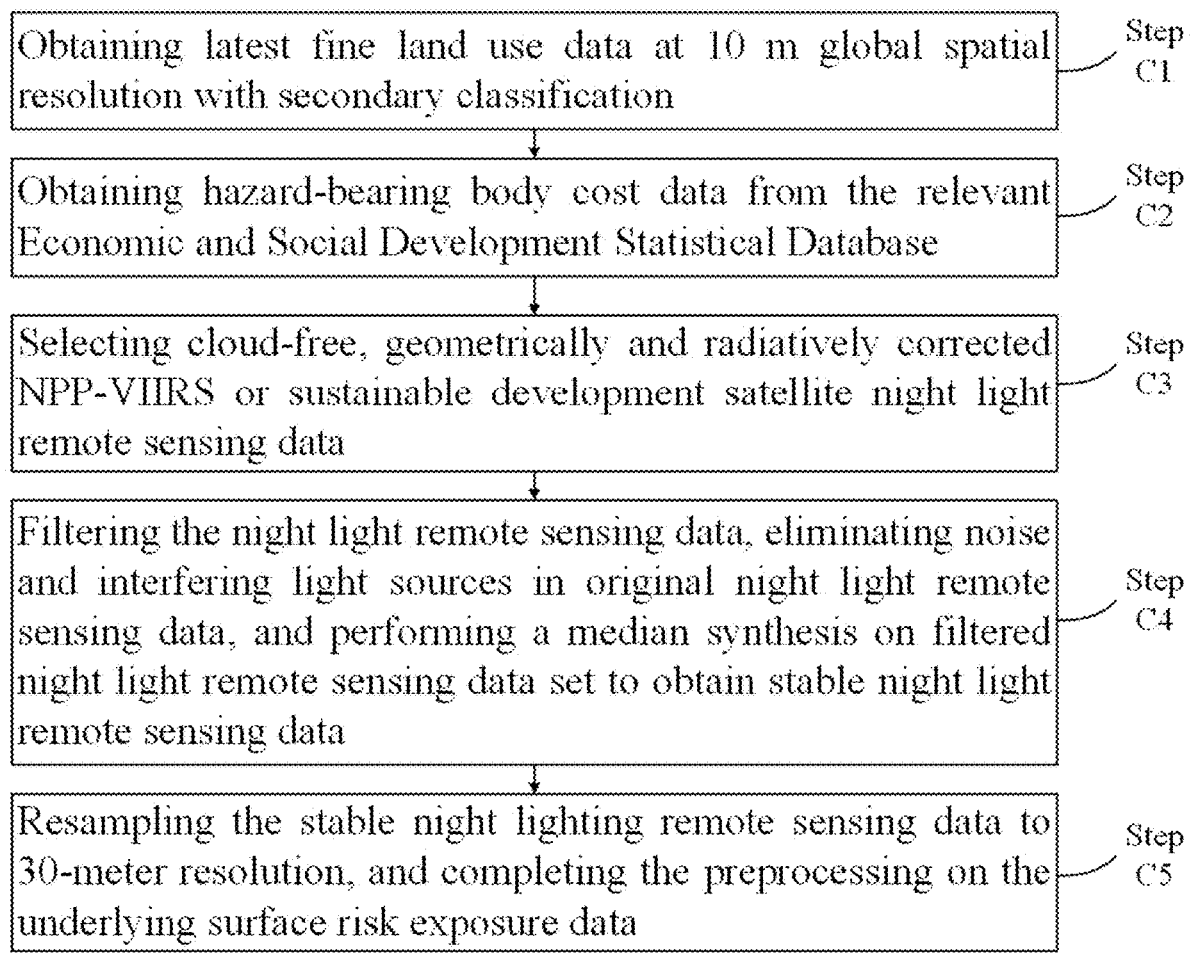
FIG. 5 illustrates procedures for obtaining and preprocessing underlying surface risk exposure data, involving fine land use data, hazard-bearing body cost data, and stable night light remote sensing data.

As shown in FIG. 5, a method for collecting and preprocessing the underlying surface risk exposure data is as follows:

Step C1, obtaining latest fine land use data at 10 m global spatial resolution with secondary classification.

Step C2, obtaining hazard-bearing body cost data from the Statistical Database.

Step C3, selecting cloud-free, geometrically and radiatively corrected NPP-VIIRS or sustainable development satellite night light remote sensing data.

Step C4, filtering the night light remote sensing data, eliminating noise and interfering light sources in original night light remote sensing data, and performing a median synthesis on filtered night light remote sensing data set to obtain stable night light remote sensing data.

Step C5, resampling the stable night lighting remote sensing data to 30-meter resolution, and completing a preprocessing on the underlying surface risk exposure data.

The losses data of typhoon flood disaster is obtained through the investigation of property insurance disaster assessment data and field sample data, and contains information such as the location, category, damage degree and direct economic losses of each hazard-bearing body.

S2, extracting reset parameters of a typhoon flood hazard-bearing body according to the preprocessed data, and constructing a feature set of the reset parameters of the typhoon flood hazard-bearing body.

In the embodiment of the disclosure, the reset parameters of the typhoon flood hazard-bearing body in the S2 include a flood inundation maximum range feature V1, a flood inundation depth feature V2, a flood inundation duration feature V3, hourly maximum rainfall V4, daily maximum rainfall V5, a maximum wind speed V6, a maximum atmospheric pressure V7 and risk exposure feature V8. The flood inundation maximum range feature V1, the flood inundation depth feature V2 and the flood inundation duration feature V3 are flood inundation features, the hourly maximum rainfall V4, the daily maximum rainfall V5, the maximum wind speed V6 and the maximum atmospheric pressure V7 are rainstorm meteorological disaster-causing features, and the risk exposure feature V8 is the underlying surface risk exposure feature.

A formula for calculating the flood inundation maximum range feature V1 is:

$$V1 = \begin{cases} 1 \sum T_{i,j} > 0 \\ 0 \sum T_{i,j} < 0 \end{cases},$$

where $T_{i,j}$ represents a flood inundation classified image with a pixel row number of i, j. In the embodiment of the disclosure, for the processed time series radar and optical satellite remote sensing data, various water body index methods, such as normalized water body enhancement index, normalized vegetation index and normalized polarization index, are adopted; and for each index, the Otsu threshold method is adopted to determine the optimal water body segmentation threshold, and the image is divided into water body and non-water body types, where the water body is assigned as 1, and the non-water body is assigned as 0, so as to form the classified image of flood inundation $T_{i,j}$.

A formula for calculating the flood inundation depth feature V2 is:

$$V2 = H_{max} - H_{i,j},$$

where $H_{max}$ represents a maximum elevation in a closed water area, and $H_{i,j}$ represents a digital elevation value with the pixel row number of i, j. In the embodiment of the disclosure, high-resolution digital elevation model data is superimposed based on the flood inundation maximum range feature V1, and the digital elevation value $H_{i,j}$ of each pixel is extracted.

A formula for calculating the flood inundation duration feature V3 is:

$$V3 = \sum \Delta t_{i,j},$$

wherein $\Delta t_{i,j}$ represents an image imaging time difference between flood inundation pixels in adjacent images with the pixel row number of i, j, and is calculated according to flood inundation classified images of time series.

Formulas for calculating the hourly maximum rainfall V4 are:

$$V4_{i,j} = \max \{RH_d\}_{i,j}$$

$$RH_d = N_m + N_{m+1},$$

where $RH_d$ represents a rainfall product of a d-th hour, a value range of d is 1 to n/2, $N_m$ represents an m-th rainfall product, a value range of m is 1 to n−1, and subscripted i, j represents the pixel row number.

Formulas for calculating the daily maximum rainfall V5 are:

$$V5_{i,j} = \max \{RD_r\}_{i,j}$$

$$RD_r = N_l + N_{l+1} + \ldots + N_{l+23},$$

where $RD_r$ represents a rainfall product on an r-th day, and a value range of r is 1 to n/24, $N_l$ represents an l-th precipitation product, and a value range of l is 1 to n−23.

In the embodiment of the disclosure, according to the preprocessed IMERG precipitation product data set $N=\{N_1, N_2, \ldots, N_n\}$, where n is the number of collected precipitation product images, an hourly rainfall data set {RH} and a daily rainfall data set {RD} are respectively generated through aggregation analysis, where the hourly rainfall data set is an image product representing one-hour rainfall by superimposing two adjacent rainfall products.

A formula for calculating the maximum wind speed V6 is:

$$V6_{i,j} = \max \{W_n\}_{i,j},$$

where $W_n$ represents a data set of time series wind speeds, and subscripted n represents a serial number in the data set.

A formula for calculating the maximum atmospheric pressure V7 is:

$$V7_{i,j} = \max \{P_n\}_{i,j},$$

where $P_n$ represents a data set of time series air pressures.

A formula for calculating the risk exposure feature V8 is:

$$V8 = aZ + b,$$

where Z represents the night light remote sensing radiation intensity, and a and b are a coefficient and an intercept obtained by training respectively.

In the embodiment of the disclosure, a linear regression model is adopted to simulate the risk exposure features of the research area, and the fitting model formula is as follows:

$$R_{i,j} = aZ_{i,j} + b,$$

where $R_{i,j}$ represents a direct economic losses of risk exposure, $Z_{i,j}$ represents the night light data intensity, and the subscripted i, j represents a pixel row number. 4000 sample points are randomly selected to complete the fitting experiment, and the values of coefficients a and b of the regression equation may be obtained.

In the embodiment of the disclosure, according to the obtained land use data with 10 m resolution and the cost data of the disaster-stricken body, the samples of the direct economic losses of the typhoon flood are obtained by using a spatial aggregation method, the sample points are 30 m×30 m unit grids, and the direct economic losses of each sample point is as follows:

$$R_i = \sum_L C_L \times A_L,$$

where $R_i$ is the direct economic losses of the sample i, L is all land types in the grid where the sample i is located, $C_L$ is cost data of the land types L, and $A_L$ is the area of the land types L in the grid point.

Finally, the constructed feature set of the reset parameters of the typhoon flood hazard-bearing body is:

$$H = S(V1, V2, V3, V4, V5, V6, V7, V8),$$

where H represents the feature set of the reset parameters of the typhoon flood hazard-bearing body, and S represents a set feature.

S3, collecting insurance disaster assessment data and historical investigation data in the typhoon flood affected area, and constructing a sample set of a direct economic losses of a hazard-bearing body.

Figure 6:
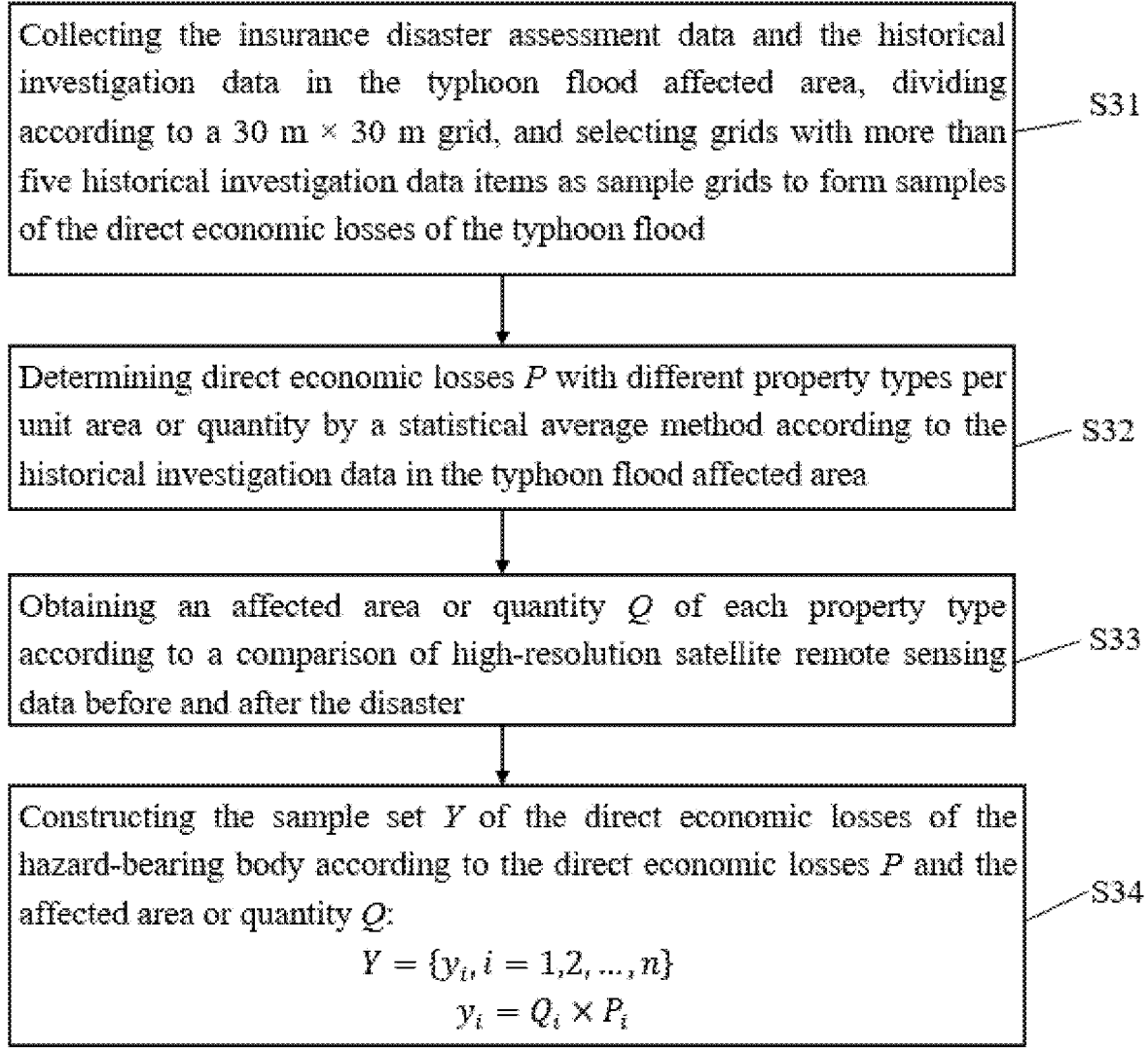
FIG. 6 illustrates a collection and processing of insurance disaster assessment data and historical investigation data, encompassing grid-based sample selection and direct economic losses determination.

As shown in FIG. 6, the S3 includes following sub-steps: S31-S34:

- S31, collecting the insurance disaster assessment data and the historical investigation data in the typhoon flood affected area, dividing according to a 30 m×30 m grid, and selecting grids with more than five historical investigation data items as sample grids to form samples of the direct economic losses of the typhoon flood. In the embodiment of the disclosure, at least 5000 samples of the direct economic losses of typhoon flood are formed.
- S32, determining direct economic losses P with different property types (farmland, industrial and mining, family, infrastructure and public facilities in the embodiment of the disclosure) per unit area or quantity by a statistical average method according to the historical investigation data in the typhoon flood affected area.
- S33, obtaining an affected area or quantity Q of each property type according to a comparison of high-resolution satellite remote sensing data before and after the disaster.
- S34, constructing the sample set Y of the direct economic losses of the hazard-bearing body according to the direct economic losses P and the affected area or quantity Q:

$$Y = \{y_i, i = 1, 2, \ldots, n, n = 5000\}$$
$$y_i = Q_i \times P_i,$$

where $y_i$ represents a total direct economic losses of an i-th sample, $Q_i$ represents an affected area or quantity of the i-th sample, $P_i$ represents a direct economic losses of the i-th sample, and n represents a total number of samples.

S4, carrying out a spatial simulation on a direct economic losses of the typhoon flood hazard-bearing body by adopting a deep learning neural network model according to the feature set of the reset parameters of the typhoon flood hazard-bearing body and the sample set of the direct economic losses of the hazard-bearing body.

Figure 7:
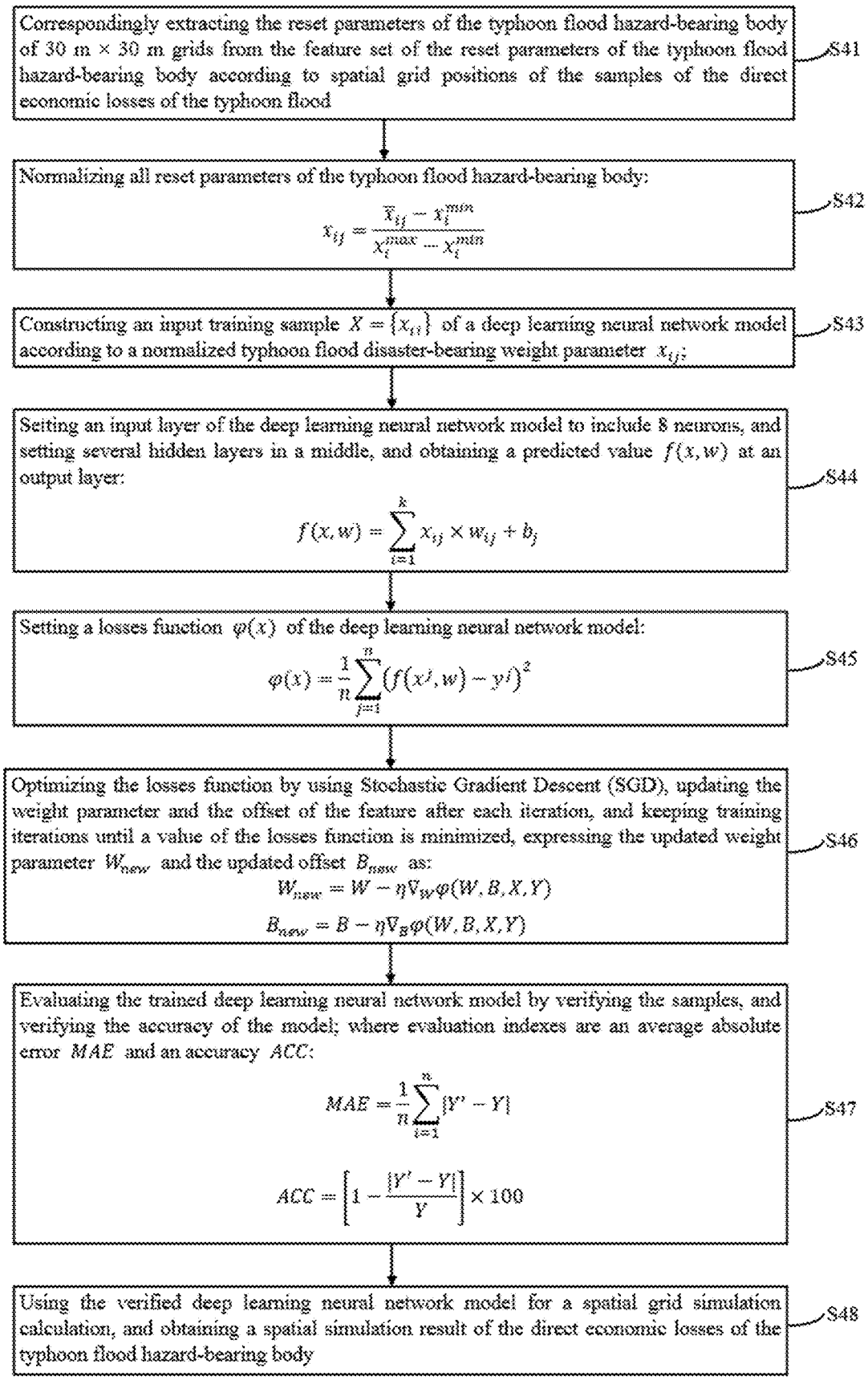
FIG. 7 illustrates a spatial simulation process utilizing a deep learning neural network model, covering reset parameter extraction, normalization, input training sample construction, model configuration, loss function definition, optimization, evaluation, and final spatial simulation calculation.
Figure 8:
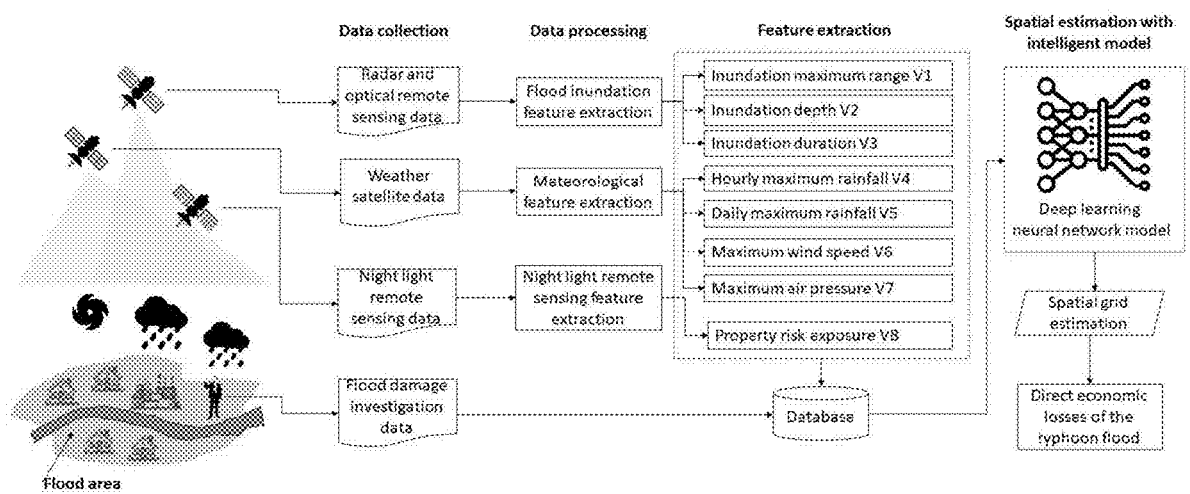
FIG. 8 shows a schematic structural diagram of spatial simulation method.
Figure 9:
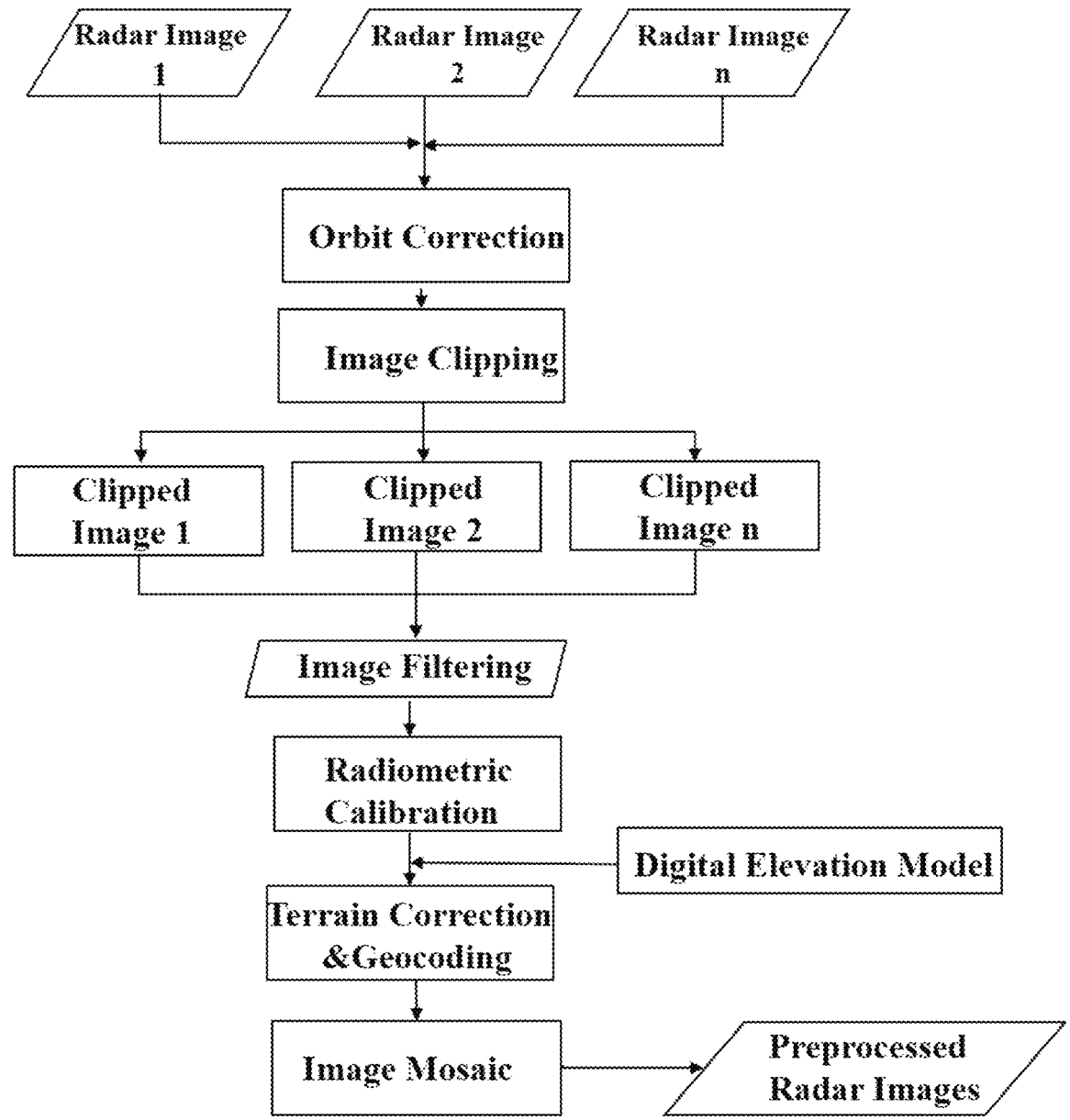
FIG. 9 shows a schematic structural diagram of Radar image processing.
Figure 10:
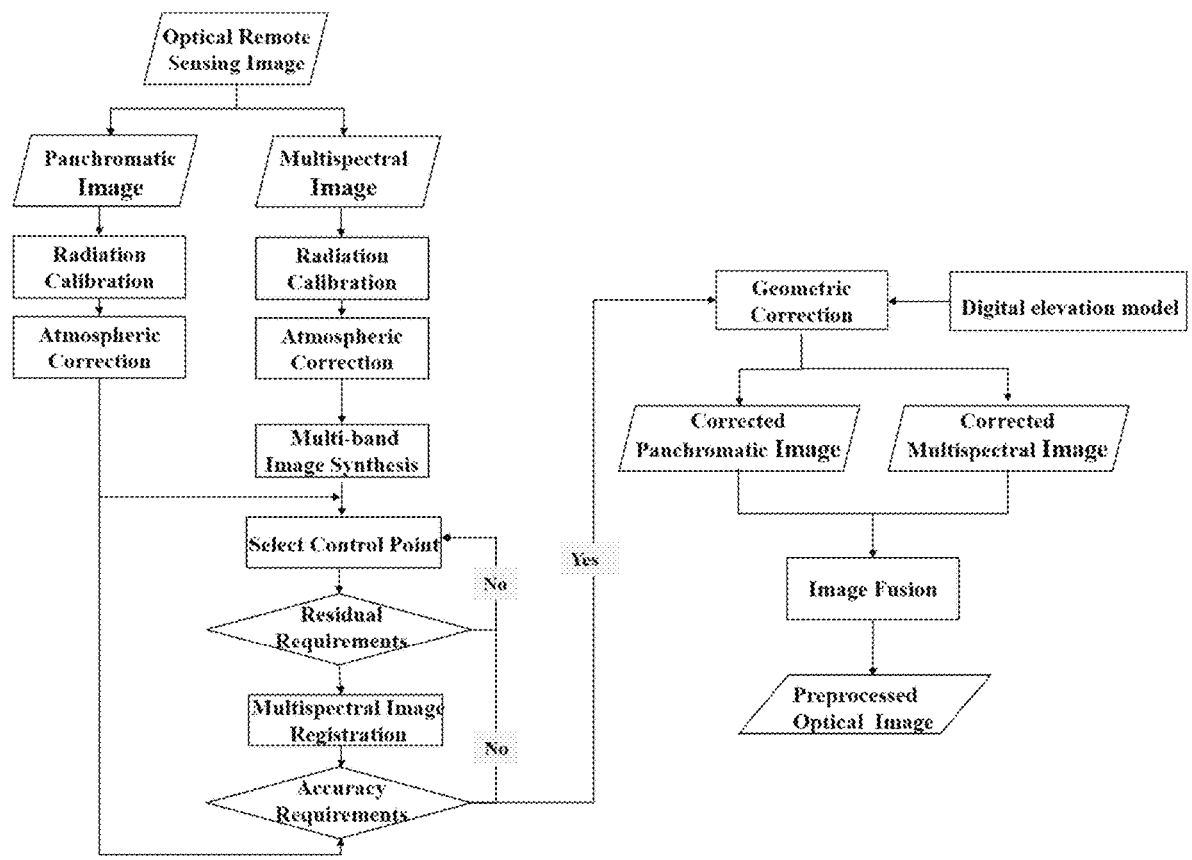
FIG. 10 shows a schematic structural diagram of Optical image processing.

As shown in FIG. 7, the S4 includes following sub-steps: S41-S48:

- S41: correspondingly extracting the reset parameters of the typhoon flood hazard-bearing body of 30 m×30 m grids from the feature set of the reset parameters of the typhoon flood hazard-bearing body according to spatial grid positions of the 5000 samples of the direct economic losses of the typhoon flood.
- S42, in order to eliminate the dimensional effect of each index and unify the change range of each index, normalizing all reset parameters of the typhoon flood hazard-bearing body, with the range of 0-1, and the normalization formula is as follows:

$$x_{ij} = \frac{\bar{x}_{ij} - x_i^{min}}{x_i^{max} - x_i^{min}},$$

where $\bar{x}_{ij}$ represents a j-th sample of an i-th feature before a normalization, $x_{ij}$ represents a j-th sample of an i-th feature after the normalization, $x_i^{min}, x_i^{max}$ respectively represent a minimum value and a maximum value of the i-th feature.

- S43, constructing an input training sample X={$x_{ij}$} of a deep learning neural network model according to a normalized typhoon flood disaster-bearing weight parameter $x_{ij}$.
- S44, since each sample has eight characteristic parameters, setting an input layer of the deep learning neural network model to include 8 neurons, and setting several hidden layers in a middle, and obtaining a predicted value f(x,w) at an output layer:

$$f(x, w) = \sum_{i=1}^{k} x_{ij} \times w_{ij} + b_j,$$

where x represents an input of a neural network, w represents a weight, $w_{ij}$ represents a weight parameter corresponding to $x_{ij}$, and $b_j$ represents an offset corresponding to $x_{ij}$.

- S45, setting a losses function φ(x) of the deep learning neural network model:

$$\varphi(x) = \frac{1}{n}\sum_{j=1}^{n}\left(f(x^j, w) - y^j\right)^2,$$

where n represents a number of samples, $f(x^j,w)$ represents a predicted value of the j-th sample and $y^j$ represents a true value of the j-th sample.

- S46, optimizing the losses function by using Stochastic Gradient Descent (SGD), updating the weight parameter and the offset of the feature after each iteration, and keeping training iterations until a value of the losses function is minimized. The updated weight parameter $W_{new}$ and the updated offset $B_{new}$ are expressed as:

$$W_{new} = W - \eta \nabla_W \varphi(W, B, X, Y)$$
$$B_{new} = B - \eta \nabla_B \varphi(W, B, X, Y),$$

where η represents a learning rate, $\nabla_W\varphi(W,B,X,Y)$ represents a gradient of the losses function in a direction of the weight W, and $\nabla_B\varphi(W,B,X,Y)$ represents a gradient of the losses function in a direction of the offset B.

In the embodiment of the disclosure, the deep learning neural network model is set with four hidden layers, and the learning rate η is set to $10^{-4}$. The capacity of training samples may have a certain impact on the model accuracy. In the embodiment of the disclosure, 80% of the samples (4000 samples) are selected as model training samples by a random method, and the remaining 20% (1000 samples) are used as model verification samples.

- S47, evaluating the trained deep learning neural network model by verifying the samples, and verifying the accuracy of the model; where evaluation indexes are an average absolute error MAE and an accuracy ACC:

$$MAE = \frac{1}{n}\sum_{i=1}^{n}|Y' - Y|$$

-continued
$$ACC = \left[1 - \frac{|Y' - Y|}{Y}\right] \times 100,$$

where Y' represents a direct economic losses of the hazard-bearing body predicted by the model, and Y represents a real direct economic losses of the hazard-bearing body.

Figure 2:
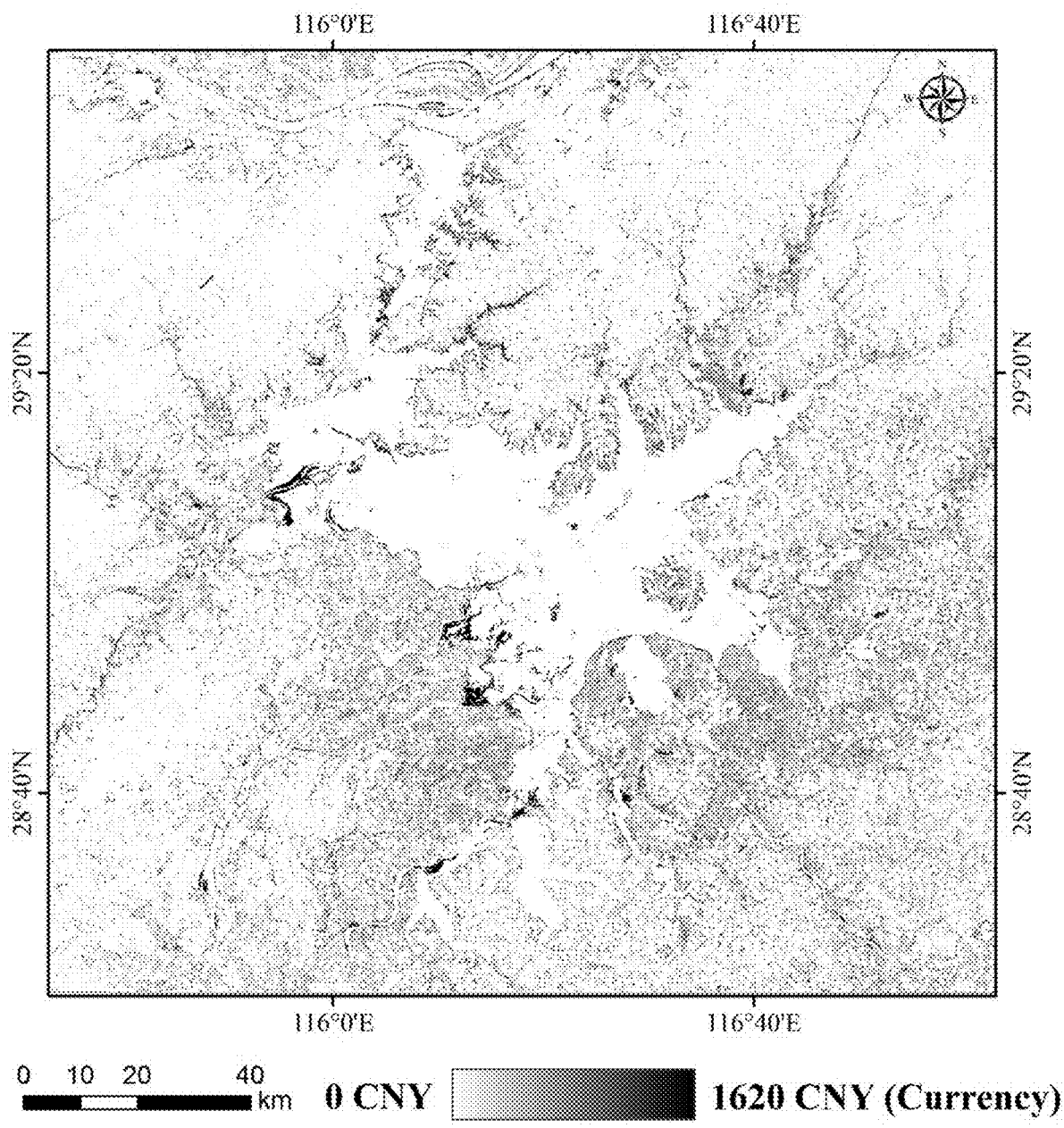
FIG. 2 is a schematic diagram of a remote sensing simulation effect of the direct economic losses of the typhoon flood hazard-bearing body provided by the embodiment of the present disclosure.

S48, using the verified deep learning neural network model for a spatial grid simulation calculation, and obtaining a spatial simulation result of the direct economic losses of the typhoon flood hazard-bearing body. As shown in FIG. 2, the result is a spatial continuous grid distribution with a spatial resolution of 30 m×30 m, and may show the spatial distribution heterogeneity of replacement value of the typhoon flood hazard-bearing body within the administrative boundary. The flowchart and block diagram in the attached figure illustrates the possible architecture, functions, and operations of systems, methods, and computer program products according to various embodiments of the present application. At this point, each box in a flowchart or block diagram may represent a module, program segment, or part of code that contains one or more executable instructions for implementing specified logical functions. It should also be noted that in some alternative implementations, the functions indicated in the boxes may also occur in a different order than those indicated in the accompanying drawings. For example, two consecutive boxes may actually be executed in parallel, and sometimes they may also be executed in the opposite order, depending on the function involved. It should also be noted that each box in the block diagram and/or flowchart, as well as the combination of boxes in the block diagram and/or flowchart, may be implemented using dedicated hardware-based systems that perform specified functions or operations, or may be implemented using a combination of dedicated hardware and computer instructions.

Those skilled in the art will realize that the embodiments described here are to help readers understand the principles of the disclosure, and it should be understood that the scope of protection of the disclosure is not limited to such special statements and embodiments. Those skilled in the art may make various other specific variations and combinations according to the technical teachings disclosed in the present disclosure without departing from the essence of the present disclosure, and these variations and combinations are still within the protection scope of the present disclosure.

What is claimed is:

1. A spatial simulation method for assessment of direct economic losses of the typhoon flood based on a remote sensing, implemented in a computer system using a set of computer-executable instructions, comprising following steps:

S1, collecting a multi-source data before and after a typhoon flood disaster in an affected area, wherein the multi-source data comprises a time series remote sensing data, a typhoon meteorological index data, an underlying surface risk exposure data and a typhoon flood disaster losses data:

wherein a method for collecting and preprocessing the time series remote sensing data comprises following steps:

Step A1, obtaining radar remote sensing data of Gaofen-3 and Sentinel-1 and optical remote sensing data from Gaofen-1, Gaofen-6 and Sentinel-2 before and after the typhoon flood disaster in the affected area, wherein the optical remote sensing data selects cloud-free and snow-free data and include 2 m panchromatic/8 m multispectral, 10 m, 20 m and 60 m multispectral images;

Step A2, performing an orbit correction, an image clipping, a filtering processing, a radiometric calibration, a terrain correction, a geocoding and an image mosaic on the radar remote sensing data to obtain preprocessed radar remote sensing data;

Step A3, performing a radiation calibration, an atmospheric correction, a geometric correction, a band registration, a multi-band image synthesis and an image fusion on the optical remote sensing data to obtain preprocessed optical remote sensing data; and Step A4, unifying the preprocessed radar remote sensing data and the preprocessed optical remote sensing data to 30-meter resolution through an image registration and a resampling, and completing a preprocessing on the time series remote sensing data;

wherein a method for collecting and preprocessing the typhoon meteorological index data comprises following steps:

Step B1, selecting a precipitation product of GPM (Global Precipitation Mission) IMERG (Integrated Multi-satellitE Retrievals for GPM), downloading product data sets of time periods before and after the disaster, reading and generating tiff files through ArcGIS (Geographic Information System), and resampling to 30-meter spatial resolution through a bilinear interpolation method; and Step B2, selecting a near real-time product data set of Meteorological Office using python to batch process original files of the near real-time product data set and converting the original files of the near real-time product data set into a raster data set, and resampling images in the raster data set to 30-meter spatial resolution by the bilinear interpolation method, and completing a preprocessing of the typhoon meteorological index data;

wherein a method for collecting and preprocessing the underlying surface risk exposure data comprises following steps:

Step C1, obtaining latest fine land use data at 10 m global spatial resolution with secondary classification;

Step C2, obtaining hazard-bearing body cost data from a relevant Economic and Social Development Statistical Database;

Step C3, selecting cloud-free, geometrically and radiatively corrected sustainable development satellite night light remote sensing data;

Step C4, filtering the night light remote sensing data, eliminating noise and interfering light sources in original night light remote sensing data, and performing a median synthesis on filtered night light remote sensing data set to obtain stable night light remote sensing data; and Step C5, resampling the stable night lighting remote sensing data to 30-meter resolution, and completing the preprocessing on the underlying surface risk exposure data;

wherein a method for collecting and preprocessing the typhoon flood disaster losses data is obtained through the comprehensive investigation of property insurance disaster assessment data and field sample data including the location, category, extent of damage, and direct economic losses incurred by each hazard-bearing body;

S2, extracting reset parameters of a hazard-bearing body according to the preprocessed data, and constructing a feature set of the reset parameters of the hazard-bearing body;

S3, collecting insurance disaster assessment data and historical investigation data in the typhoon flood affected area, and constructing a sample set of direct economic losses of the hazard-bearing body; and S4, carrying out a spatial simulation on the direct economic losses of the hazard-bearing body by adopting a deep learning of a neural network model according to the feature set of the reset parameters of the hazard-bearing body and the sample set of the direct economic losses of the hazard-bearing body.

2. The spatial simulation method for assessment of direct economic losses of the typhoon flood based on the remote sensing according to claim 1, wherein the reset parameters of the typhoon flood hazard-bearing body in the S2 comprises a flood inundation maximum range feature V1, a flood inundation depth feature V2, a flood inundation duration feature V3, an hourly maximum rainfall V4, a daily maximum rainfall V5, a maximum wind speed V6, a maximum atmospheric pressure 17 and a risk exposure feature V8;

a formula for calculating the flood inundation maximum range feature V1 is:

$$V1 = \begin{cases} 1 & \sum T_{i,j} > 0 \\ 0 & \sum T_{i,j} < 0 \end{cases},$$

wherein $T_{i,j}$ represents a flood inundation classified image with a pixel row number of i, j;

a formula for calculating the flood inundation depth feature V2 is:

$$V2 = H_{max} - H_{i,j},$$

wherein $H_{max}$ represents a maximum elevation in a closed water area, and $H_{i,j}$ represents a digital elevation value with the pixel row number of i, j;

a formula for calculating the flood inundation duration feature V3 is:

$$V3 = \sum \Delta t_{i,j},$$

wherein $\Delta t_{i,j}$ represents an image imaging time difference between flood inundation pixels in adjacent images with the pixel row number of i, j;

formulas for calculating the hourly maximum rainfall V4 are:

$$V4_{i,j} = \max\{RH_d\}_{i,j}$$

$$RH_d = N_m + N_{m+1},$$

wherein $RH_d$ represents a rainfall product of a d-th hour, $N_m$ represents an m-th rainfall product, and subscripted i, j represents the pixel row number;

formulas for calculating the daily maximum rainfall V5 are:

$$V5_{i,j} = \max\{RD_r\}_{i,j}$$

$$RD_r = N_l + N_{l+1} + \ldots + N_{l+23},$$

wherein $RD_r$ represents a rainfall product on an r-th day, and $N_l$ represents an l-th precipitation product;

a formula for calculating the maximum wind speed V6 is:

$$V6_{i,j} = \max\{W_n\}_{i,j},$$

wherein $W_n$ represents a data set of time series wind speeds, and subscripted n represents a serial number in the data set;

a formula for calculating the maximum atmospheric pressure V7 is:

$$V7_{i,j} = \max\{P_n\}_{i,j},$$

wherein $P_n$ represents a data set of time series air pressures;

a formula for calculating the risk exposure feature V8 is:

$$V8 = aZ + b,$$

wherein Z represents the night light remote sensing radiation intensity, and a and b are a coefficient and an intercept obtained by training respectively.

3. The spatial simulation method for assessment of direct economic losses of the typhoon flood based on the remote sensing according to claim 1, wherein the feature set of the reset parameters of the typhoon flood hazard-bearing body constructed in the S2 is:

$$H = S(V1, V2, V3, V4, V5, V6, V7, V8),$$

wherein H represents the feature set of the reset parameters of the typhoon flood hazard-bearing body, and S represents a set feature.

4. The spatial simulation method for assessment of direct economic losses of the typhoon flood based on the remote sensing according to claim 1, wherein the S3 comprises following sub-steps:

S31, collecting the insurance disaster assessment data and the historical investigation data in the typhoon flood affected area, dividing according to a 30 m×30 m grid, and selecting grids with more than five historical investigation data items as sample grids to form samples of the direct economic losses of the typhoon flood;

S32, determining direct economic losses P with different property types per unit area or quantity by a statistical average method according to the historical investigation data in the typhoon flood affected area;

S33, obtaining an affected area or quantity Q of each property type according to a comparison of high-resolution satellite remote sensing data before and after the disaster; and S34, constructing the sample set Y of the direct economic losses of the hazard-bearing body according to the direct economic losses P and the affected area or quantity Q:

$$Y = \{y_i, i = 1, 2, \ldots, n\}$$
$$y_i = Q_i \times P_i,$$

wherein $y_i$ represents a total direct economic losses of an i-th sample, $Q_i$ represents an affected area or quantity of the i-th sample, $P_i$ represents a direct economic losses of the i-th sample, and n represents a total number of samples.

5. The spatial simulation method for assessment of direct economic losses of the typhoon flood based on the remote sensing according to claim 3, wherein the S4 comprises following sub-steps:

S41, correspondingly extracting the reset parameters of the typhoon flood hazard-bearing body of 30 m×30 m grids from the feature set of the reset parameters of the typhoon flood hazard-bearing body according to spatial grid positions of the samples of the direct economic losses of the typhoon flood;

S42, normalizing all reset parameters of the typhoon flood hazard-bearing body:

$$x_{ij} = \frac{\bar{x}_{ij} - x_i^{min}}{x_i^{max} - x_i^{min}},$$

wherein $\bar{x}_{ij}$ represents a j-th sample of an i-th feature before a normalization, $x_{ij}$ represents a j-th sample of an i-th feature after the normalization, $x_i^{min}, x_i^{max}$ respectively represent a minimum value and a maximum value of the i-th feature;

S43, constructing an input training sample $X=\{x_{ij}\}$ of a deep learning neural network model according to a normalized typhoon flood disaster-bearing weight parameter $x_{ij}$;

S44, setting an input layer of the deep learning neural network model to comprise 8 neurons, and setting several hidden layers in a middle, and obtaining a predicted value f(x,w) at an output layer:

$$f(x, w) = \sum_{i=1}^{k} x_{ij} \times w_{ij} + b_j,$$

wherein x represents an input of a neural network, w represents a weight, $w_{ij}$ represents a weight parameter corresponding to $x_{ij}$, and $b_j$ represents an offset corresponding to $x_{ij}$;

S45, setting a losses function φ(x) of the deep learning neural network model:

$$\varphi(x) = \frac{1}{n} \sum_{j=1}^{n} \left(f(x^j, w) - y^j\right)^2,$$

wherein n represents a number of samples, $f(x^j,w)$ represents a predicted value of the j-th sample and $y^j$ represents a true value of the j-th sample;

S46, optimizing the losses function by using Stochastic Gradient Descent (SGD), updating the weight parameter and the offset of the feature after each iteration, and keeping training iterations until a value of the losses function is minimized, expressing the updated weight parameter $W_{new}$ and the updated offset $B_{new}$ as:

$$W_{new} = W - \eta \nabla_W \varphi(W, B, X, Y)$$
$$B_{new} = B - \eta \nabla_B \varphi(W, B, X, Y),$$

wherein η represents a learning rate, $\nabla_W \varphi(W,B,X,Y)$ represents a gradient of the losses function in a direction of the weight W, and $\nabla_B \varphi(W,B,X,Y)$ represents a gradient of the losses function in a direction of the offset B;

S47, evaluating the trained deep learning neural network model by verifying the samples, and verifying the accuracy of the model; wherein evaluation indexes are an average absolute error MAE and an accuracy ACC:

$$MAE = \frac{1}{n} \sum_{i=1}^{n} |Y' - Y|$$
$$ACC = \left[1 - \frac{|Y' - Y|}{Y}\right] \times 100,$$

wherein Y' represents a direct economic loss of the hazard-bearing body predicted by the model, and Y represents a real direct economic loss of the hazard-bearing body; and S48, using the verified deep learning neural network model for a spatial grid simulation calculation, and obtaining a spatial simulation result of the direct economic losses of the typhoon flood hazard-bearing body.

* * * * *